US005110078A

United States Patent [19]

Gary

[11] Patent Number: 5,110,078

[45] Date of Patent: May 5, 1992

[54] DECORATIVE LIGHT SUPPORT ASSEMBLY

[75] Inventor: Lonnie F. Gary, Lubbock, Tex.

[73] Assignee: Gary Products Group, Inc., Lubbock, Tex.

[21] Appl. No.: 706,562

[22] Filed: May 28, 1991

Related U.S. Application Data

[63] Continuation of Ser. No. 478,623, Feb. 12, 1990, abandoned, which is a continuation-in-part of Ser. No. 257,392, Oct. 13, 1988, Pat. No. 4,901,960, and a continuation-in-part of Ser. No. 294,266, Jan. 6, 1989, Pat. No. 4,962,907.

[51] Int. Cl.[5] .......... F16B 47/00

[52] U.S. Cl. .......... 248/206.2; 248/316.1; 362/249

[58] Field of Search .......... 248/206.2, 206.5, 205.6, 248/205.7, 205.8, 205.9, 206.1, 206.3, 206.4, 314, 231.8, 254; 362/249, 457

[56] References Cited

U.S. PATENT DOCUMENTS

| | | | |
|---|---|---|---|
| 1,532,308 | 4/1925 | Downing | 248/205.5 |
| 1,751,463 | 3/1930 | Backus et al. | 248/205.5 X |
| 2,221,238 | 11/1940 | Johnson | 248/205.5 |
| 2,698,155 | 12/1954 | Bowman | 248/205.5 X |
| 3,189,310 | 6/1965 | Trueson | 248/314 |
| 3,310,267 | 3/1967 | Koehler | 248/205.8 X |
| 3,504,169 | 3/1970 | Freeburger | 362/249 |
| 4,588,153 | 5/1986 | Boston et al. | 248/206.2 X |
| 4,607,875 | 8/1986 | McGirr | 248/205.9 X |
| 4,877,209 | 10/1989 | Gary | 248/205.3 |
| 4,901,960 | 2/1990 | Gary | 248/205.3 |
| 4,986,504 | 1/1991 | Gary | 248/205.3 |

FOREIGN PATENT DOCUMENTS

| | | | |
|---|---|---|---|
| 2600244 | 12/1987 | France | 248/206.2 |
| 0388224 | 2/1933 | United Kingdom | 248/206.1 |

*Primary Examiner*—Ramon O. Ramirez

*Attorney, Agent, or Firm*—Ross, Howison, Clapp & Korn

[57] ABSTRACT

A decorative light support assembly adapted to releasably support a decorative bulb and socket assembly in substantially fixed positional relation on a relatively smooth, substantially planar support surface, the assembly comprising a suction cup member, a socket support member, and means for attaching the suction cup member to the socket support member, the socket support member further comprising space-apart socket support arms adapted to maintain the decorative bulb and socket assembly in a preferred alignment with the socket support member.

8 Claims, 2 Drawing Sheets

DECORATIVE LIGHT SUPPORT ASSEMBLY

CROSS-REFERENCE TO RELATED APPLICATIONS

This application is a file wrapper continuation of application Ser. No. 478,623, filed Feb. 12, 1990, now abandoned, which is a continuation-in-part of application Ser. No. 257,392, filed Oct. 13, 1988, issued Feb. 20, 1990, as U.S. Pat. No. 4,901,960, and a continuation-in-part of application Ser. No. 294,266, filed Jan. 6, 1989, issued Oct. 16, 1990 as U.S. Pat. No. 4,962,907.

TECHNICAL FIELD

This invention relates to devices for holding decorative lights, and more particularly, to a decorative light support assembly adapted to support a decorative bulb and socket assembly on a relatively smooth, substantially planar surface such as glass.

BACKGROUND OF THE INVENTION

Applicant has previously disclosed numerous devices that are useful for supporting decorative bulb and socket assemblies on substantially planar support surfaces. Such devices have previously relied upon adhesive pads, screw-type fasteners, or the like, for securing the light support bracket to the substantially planar surface. One disadvantage that has been experienced with prior art devices utilizing adhesive pads for attachment to the support surface is that the devices are sometimes difficult to remove, and leave an adhesive residue on the support surface following removal. Accordingly, a decorative light support assembly is needed that can be utilized to support a decorative bulb and socket assembly on a planar support surface such as glass, yet is capable of being easily removed without marking or otherwise injuring the support surface.

SUMMARY OF THE INVENTION

According to the present invention, a decorative light support assembly is provided that comprises a suction cup member in combination with a socket support member. The suction cup member is preferably molded from a flexible polymeric material such as a rubber or rubber-modified plastic. The socket support member is preferably molded from an injection moldable thermoplastic resin such as an acrylic resin. The suction cup member preferably further comprises a boss and a projecting member adapted to engage the socket support member.

During use, the suction cup portion of the decorative light support assembly of the invention is preferably pushed against a relatively smooth, substantially planar support surface, forcing air out of the space between the suction cup and the support surface, thereby creating a partial vacuum sufficient to support the the decorative light support assembly and a decorative bulb and socket assembly held by the socket support member in a substantially fixed position relative to the support surface.

BRIEF DESCRIPTION OF THE DRAWINGS

The apparatus of the invention is further described and explained in relation to the following figures of the drawings wherein.

Like numerals are used to indicate like parts in all figures of the drawings.

DESCRIPTION OF THE PREFERRED EMBODIMENT

Figure 1:
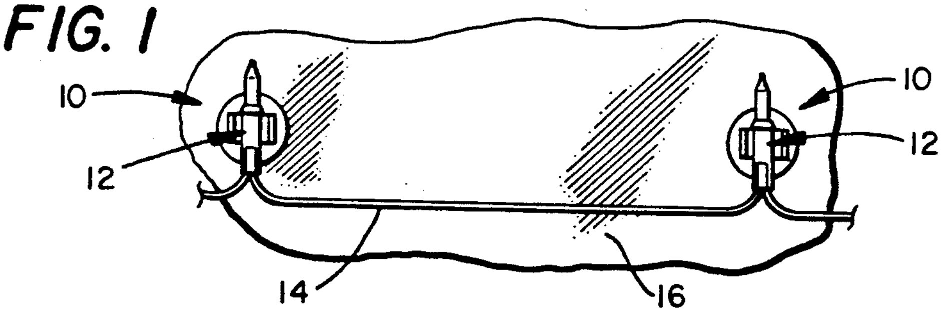
FIG. 1 is a front elevation view depicting two spaced-apart decorative light support assemblies of the invention installed on a planar surface, with a decorative bulb and socket assembly being held by the socket support member of each assembly.
Figure 2:
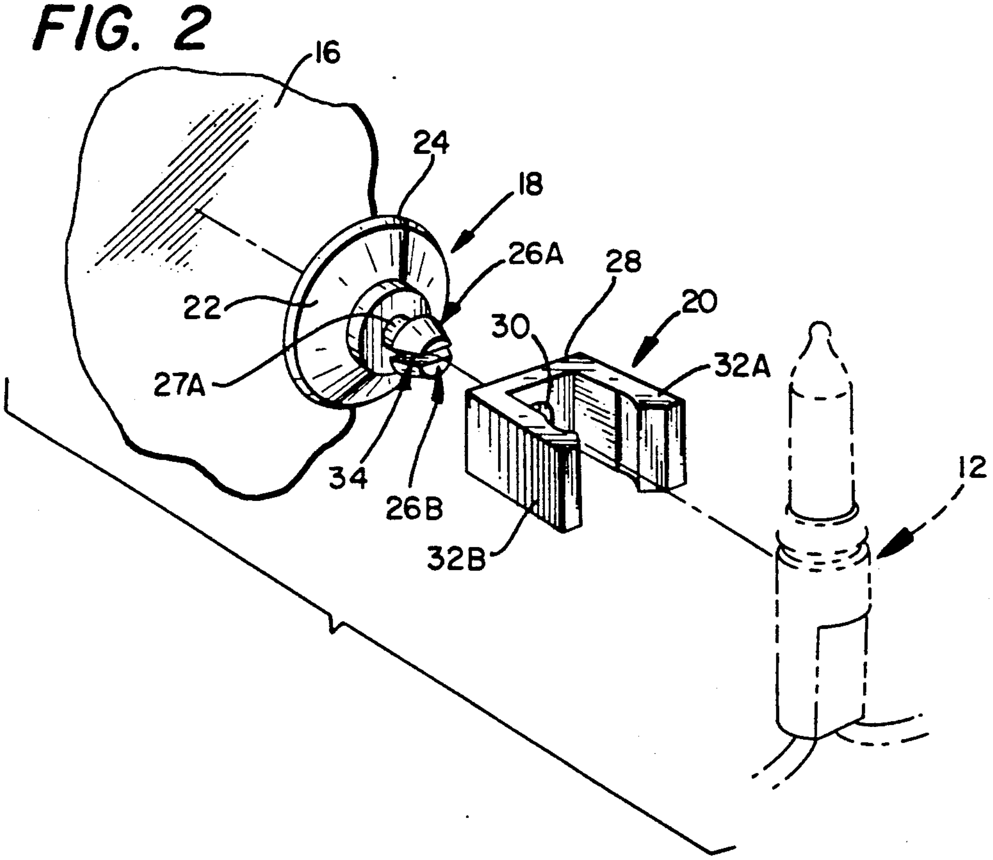
FIG. 2 is an exploded perspective view of the suction cup member and the socket support member of the subject decorative light support assembly disposed between a planar surface and a decorative bulb and socket assembly (shown in phantom outline)
Figure 3:
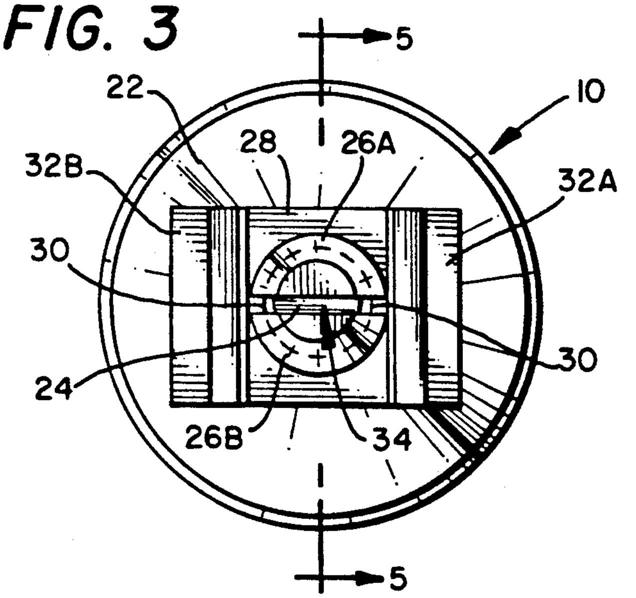
FIG. 3 is a front elevation view of the decorative light support assembly of the invention.
Figure 4:
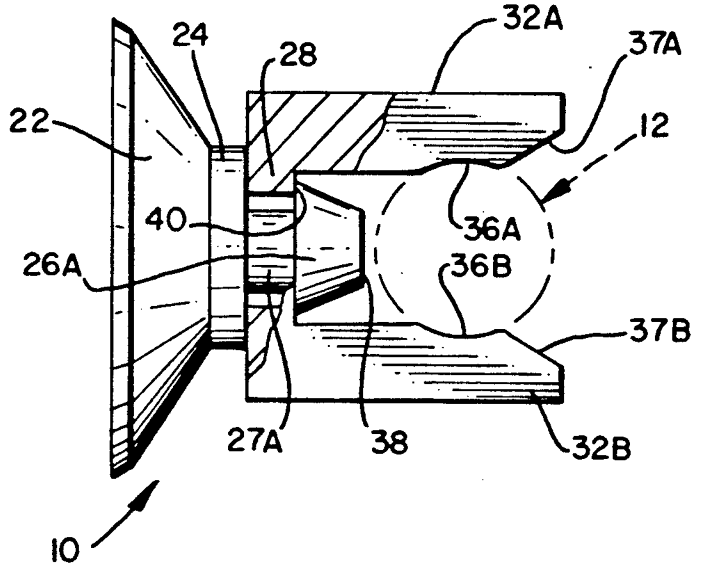
FIG. 4 is a top view, partially broken away, of the decorative light support assembly of the invention with the diameter of a decorative light socket shown in phantom outline.

Referring to FIG. 1, two decorative light support assemblies 10 are shown attached to relatively smooth, substantially planar support surface 16. A decorative bulb and socket assembly 12 is shown being supported by each decorative light and socket assembly 10. The two decorative bulb and socket assemblies 12 are connected to each other by electrical conductors 14 in the manner common to commercially available decorative light strings.

Referring to FIGS. 2 through 5, decorative light support assembly 10 preferably further comprises suction cup member 18 and socket support member 20. Suction cup member 18 is preferably molded from a flexible polymeric material such as a rubber or rubber-modified plastic. Socket support member 20 is preferably molded from an injection moldable thermoplastic resin such as an acrylic resin.

Suction cup member 18 preferably further comprises suction cup 22, boss 24, and spaced-apart, tapered projecting members 26A, 26B adapted to engage socket support member 20. Reduced diameter sections 27A, 27B of projecting members 26A, 26B are provided adjacent boss 24 to assist in providing engagement with socket support member 20 as further discussed below. Although spaced-apart, tapered projecting members separated by slot 34 are depicted herein as a preferred structure for attaching suction cup member 18 to socket support member 20, it will be understood that other similarly effective means can also be utilized. Thus, for example, a single projecting member made of a material adapted to be compressed to a greater degree during insertion can be substituted for the spaced projecting members disclosed in the preferred embodiment.

Socket support member 20 preferably further comprises a plurality of spaced-apart socket support arms 32A, 32B extending outwardly away from base portion 28 and planar support surface 16. Base portion 28 preferably further comprises an aperture 30 adapted to receive and engage projecting members 26A, 26B of suction cup member 18. The diameter of aperture 30 is desirably slightly less than the outer diameter of projecting members 26A, 26B when projecting members 26A, 26B are not compressed.

During insertion of projecting members 26A, 26B through aperture 30 to engage suction cup member 18 to socket support member 20, projecting members 26A, 26B are preferably compressed against each other, thereby temporarily reducing the width of or eliminating the gap in the outwardly extending portion of slot 34 away from boss 24. Once shoulders 40A, 40B of projecting members 26A, 26B have cleared base portion 28, however, slot 34 is desirably reformed as projecting members 26A, 26B spring back apart. Shoulders 40A, 40B are then maintained in facing contact with the outwardly extending face of base portion 28.

The distance between shoulders 40A, 40B and boss 24 is preferably approximately the same as the thickness of base portion 28 to insure a relatively snug fit so that socket support member 20 will not wobble unnecessarily when engaged with suction cup member 18. Front faces 38A, 38B of projecting members 26A, 26B preferably do not extend sufficiently outward to interfere with a decorative bulb and socket assembly 12 disposed between socket support arms 32A, 32B. The radial edges of projecting members 26A, 26B are preferably tapered between front faces 38A, 38B and shoulders 40A, 40B to facilitate engagement of suction cup member 18 with socket support member 20.

According to a preferred embodiment of the invention, projecting members 26A, 26B are adapted to releasably engage socket support member 20, but the force required to separate suction cup member 18 from socket support member 20 once engaged is desirably greater than the force exerted on socket support member 20 by the weight of decorative bulb and socket assembly 12.

Socket support arms 32A,·32B are preferably spaced sufficiently apart to enable a decorative bulb and socket assembly 12 of the desired size to be inserted and held snugly therebetween. Detents 36A, 36B are preferably provided to assist in holding and maintaining the alignment of decorative bulb and socket assembly 12. Beveled surfaces 37A, 37B are preferably provided to facilitate insertion of decorative bulb and socket assembly 1 therebetween.

Figure 5:
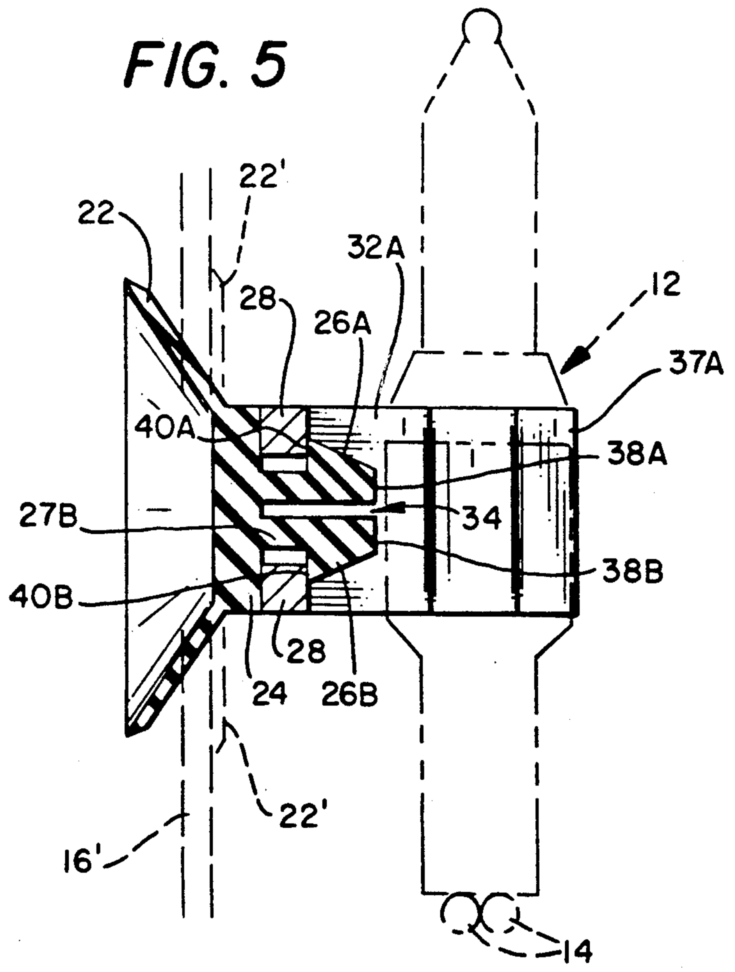
FIG. 5 is a sectional side elevation view of the decorative light support assembly of the invention taken along line 5—5 of FIG. 3, and further showing in phantom outline a decorative bulb and socket assembly in the position in which it would be supported by the decorative light support assembly of the invention.

Referring to FIG. 5, suction cup 22 is shown in its relaxed state and also in phantom as suction cup 22' as it would appear if pushed against a support surface 16' to establish a partial vacuum between suction cup 22' and support surface 16'.

Other alterations and modifications of the invention will become apparent to those of ordinary skill in the art upon reading the present disclosure and it is intended that the present invention be limited only by the broadest interpretation of the appended claims to which the inventor may be legally entitled.

I claim:

1. A decorative light support assembly adapted to support a decorative bulb and socket assembly on a substantially planar support surface, said decorative light support assembly comprising a suction cup member and a socket support member, said suction cup member having a suction side adapted to releasably engage said substantially planar support surface and a second side opposite said suction side comprising means adapted to releasably engage said socket support member, and said socket support member further comprising means for releasably engaging and supporting a decorative bulb and socket assembly in substantially parallel alignment to the substantially planar support surface.

2. The decorative light support assembly of claim 1 wherein said suction cup member comprises at least one projecting member adapted to engage said socket support member and said socket support member comprises a base portion having at least one aperture adapted to receive each said projecting member.

3. The decorative light support assembly of claim 1 wherein said socket support member is made of a moldable polymeric resin.

4. The decorative light support assembly of claim 2 wherein said suction cup member further comprises two spaced-apart projecting members adapted to engage said socket support member.

5. The decorative light support assembly of claim 1 wherein said socket support member further comprises a plurality of space-apart, outwardly extending socket support arms.

6. The decorative light support assembly of claim 5 wherein said socket support arms further comprise means for maintaining said decorative bulb and socket assembly in a preferred alignment to said socket support member.

7. A decorative light support assembly adapted to support a decorative bulb and socket assembly on a substantially planar support surface, said decorative light support assembly comprising a suction cup portion and a socket support portion, said suction cup portion having a suction side adapted to releasably engage said substantially planar support surface and a second side opposite said suction side that is connected to said socket support portion; and said socket support portion further comprising means for releasably engaging and supporting a decorative bulb and socket assembly in substantially parallel alignment to the substantially planar support surface.

8. The decorative light support assembly of claim 7 wherein said socket support portion further comprises a plurality of spaced-apart, outwardly extending socket support arms.

* * * * *